(12) United States Patent
Khliust et al.

(10) Patent No.: US 10,586,430 B2
(45) Date of Patent: *Mar. 10, 2020

(54) SECURE DIGITAL COUPON DISPLAY AND READING

(71) Applicant: ELEKS R&D, INC., New York, NY (US)

(72) Inventors: Pavlo Khliust, Kyiv (UA); Volodymyr Getmanskyi, Lviv (UA)

(73) Assignee: ELEKS R&D, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,908

(22) Filed: Jul. 19, 2019

(65) Prior Publication Data

US 2019/0347910 A1    Nov. 14, 2019

Related U.S. Application Data

(63) Continuation of application No. 15/621,155, filed on Jun. 13, 2017, now Pat. No. 10,403,100.

(60) Provisional application No. 62/349,592, filed on Jun. 13, 2016, provisional application No. 62/371,831, filed on Aug. 7, 2016.

(51) Int. Cl.
| | |
|---|---|
| *G06K 19/06* | (2006.01) |
| *G07G 1/00* | (2006.01) |
| *G07D 7/0043* | (2016.01) |
| *G06Q 20/32* | (2012.01) |
| *G06Q 20/20* | (2012.01) |
| *G06K 7/12* | (2006.01) |

(52) U.S. Cl.
CPC ..... *G07G 1/0045* (2013.01); *G06K 19/06112* (2013.01); *G06Q 20/204* (2013.01); *G06Q 20/3274* (2013.01); *G07D 7/0043* (2017.05); *G07G 1/0081* (2013.01); *G06K 7/12* (2013.01)

(58) Field of Classification Search
CPC ....... G06K 19/06009; G06K 19/06018; G06K 19/06028; G06K 19/06037; G06K 19/06112; G06Q 20/3274
See application file for complete search history.

(56) References Cited

U.S. PATENT DOCUMENTS

| | | | | |
|---|---|---|---|---|
| 5,450,491 | A * | 9/1995 | McNair ............ | G06K 19/06028 713/184 |
| 9,245,219 | B2 * | 1/2016 | Van Horn ......... | G06Q 30/0207 |

(Continued)

*Primary Examiner* — Thien M Le
*Assistant Examiner* — April A Taylor
(74) *Attorney, Agent, or Firm* — Michael J. Feigin, Esq.; Feigin and Fridman LLC (57) ABSTRACT

A code is displayed on a screen with a first set of indicia, the code designed to be read only by a computer system. A second code is displayed only when it is determined that the code is being read. This determination is made by an optical sensor, such as a camera, detecting a particular wavelength of light above a threshold, the wavelength associated with an expected reader device. While the particular wavelength is detected the second code is displayed. Once the light is no longer detected, the display reverts back to the first code. In this manner, the second code, such as a barcode to be read is only displayed while the barcode is actually being read, but is otherwise hidden from view. The entire process can take place in under a second or in a fraction of a second, such as 1/10th of a second or less.

14 Claims, 6 Drawing Sheets

(56) References Cited

U.S. PATENT DOCUMENTS

| | | | |
|---|---|---|---|
| 9,542,679 B2 * | 1/2017 | Liou | G06K 19/06112 |
| 9,607,257 B2 * | 3/2017 | Cha | G06K 19/06112 |
| 9,659,245 B1 * | 5/2017 | Jeon | G06K 7/10732 |
| 9,672,458 B2 * | 6/2017 | Burkhart | G06K 19/06037 |
| 10,403,100 B1 * | 9/2019 | Khliust | G07G 1/0045 |
| 2006/0054695 A1 * | 3/2006 | Owada | G06K 7/1095 235/440 |
| 2012/0067943 A1 * | 3/2012 | Saunders | G06K 7/1095 235/375 |
| 2017/0243040 A1 * | 8/2017 | Burkhart | G06K 19/06037 |

* cited by examiner

SECURE DIGITAL COUPON DISPLAY AND READING

FIELD OF THE DISCLOSED TECHNOLOGY

The disclosed technology relates generally to data displayed in an encoded format and reading thereof, and more specifically, to a method of displaying the encoded data only substantially while the data is being read.

BACKGROUND OF THE DISCLOSED TECHNOLOGY

Barcodes are display codes designed to be read by machine and translated into a string of alphanumeric text or other usable data. They come in many forms, some of which are standardized by the International Standards Organization (e.g. code 39 and ISO 15420). Two-dimensional codes are also used, some of which are known as "QR" codes.

For purposes of this disclosure, a barcode is defined as a code designed to be read by a computer or an electronic scanner, to the exclusion of a human, which has data stored therein. Such barcodes are typically scanned by optical scanners or "barcode readers" which function by shining an LED or laser light beam at a barcode and measuring the reflected response with a photoelectric cell.

Barcodes work great for identifying a product where low security is needed or there are other forms of security such as a human checking the result against, for example, a product they are looking at while ringing up an item for purchase. However, when higher security is needed, barcodes fail because they can very easily be reproduced. For example, if one has a coupon for 50% off an item, one can make thousands of copies and distribute this to others who can then take advantage of the copy. If the coupon or other data represented on a barcode is to only be used once, one must have a backend system of determining if the barcode has already been used. Where, for example, the barcode could be used at one of thousands of locations, this is often expensive or impractical.

Therefore, what is needed is a way to use a barcode or other coded system, the code being readable by current barcode reading technology (laser, LED, photograph or other optical scanners and sensors) which has higher security than known at the present time.

SUMMARY OF THE DISCLOSED TECHNOLOGY

Therefore, embodiments of the disclosed technology function by displaying a barcode on a screen only when it is determined that the barcode is being read. First, a "dummy" barcode or other code of some kind is displayed on a screen and when a camera determines that a laser or LED light of a particular wavelength, and above a threshold intensity, is being shined at the screen, the "real" or second barcode is displayed. As soon as the barcode is no longer being read, the first barcode or other code is then displayed again. In this manner, the "real" barcode is only displayed when the barcode reader is reading same. As such, during typical usage, the second barcode is hidden from view of a user and not displayed on the screen ordinarily, preventing, at least, casual copying of the barcode.

More specifically, in a method of authentication of a code, one exhibits a first code on a screen visible to a user such as an LED (light emitting diode) or other screen of a handheld transceiver. This device on which the code is being exhibited also has a camera on the same side of the device/facing perpendicular to the plane of the screen, or at least a part thereof. The camera detects a specific wavelength of light above a threshold of intensity. The threshold of intensity is always more than ambient light received at the particular wavelength and in some embodiments determined by a particular wavelength received, being at least double the lux of other non-reading wavelength or control wavelengths received (such as those, for example, in the blue spectrum when read with a reader using the red part of the spectrum). In response to the detecting of the specific wavelength above the threshold by the camera (defined as a light sensor with capability to differentiate between different wavelengths of light, for purposes of this disclosure) the first code displayed on the screen is changed to a second code, such as a barcode. When the reading of the barcode is no longer detected (e.g. light at the specific wavelength or range of wavelengths ceases to be detected by the camera) the second code is no longer exhibited.

It should be further understood that when "wavelength" is used, this is inclusive of a range of wavelengths around a particular wavelength. For example, a red laser is typically at 650 nanometers wavelength. The range of the wavelength for detection purposes can be plus or minus 10 nanometers or another margin of error defined by the operator of the methods of the disclosed technology.

The specific wavelength of light which is detected can pass across not only the camera (optical sensor) but also at least a part of the first code, and in turn, the second code displayed on the screen. A confirmation is received indicating that the second code has been read, in some embodiments of the disclosed technology. Such a confirmation can be an audible beep, a confirmation sent wirelessly to the device displaying the barcode, or a different wavelength of light or coded pulse of light sent to the camera of the device displaying the barcode.

The second code is displayed on the screen only while the wavelength of light above a threshold of intensity is detected by the camera. As soon as the wavelength above the threshold is undetected for any reason, in some embodiments of the disclosed technology, the second code is no longer displayed as a security measure. The barcodes and other codes used can be intended such that only a computer system (device is electro-optical sensor and silicon-based processor or the equivalent) can read (defined as "interpret" or "translate") the code into another form, such as alphanumeric characters. The second code can be a coupon (defined as an item which, when redeemed, provides a discount on a purchase).

Authentication feedback can be given. This is carried out by receiving data representative of the first code from another device, indicating that the first code has been read and in response to the receiving data representative of the first code and the detection of same, the second code is displayed. Thus, it is verified that the first code has been read before displaying the second code, and it is further verified that there is a light beam shining on the code at present. Only then is the second code displayed. Then the process repeats with receiving a notification that the second code has been read, and the display of the second code reverts back to displaying the first code. This reversion can always take place when the light from the code reader is no longer detected. The manner in which the confirmation from the reading device that the first and second code have been read can include coded pulses of light sent to the camera of the device displaying the codes.

Any of the methods described above can be carried out alone or in combination in under half a second, one second, or three seconds.

A method of authenticating a displayed code can also be described as follows. One shines a laser or LED light of a discrete wavelength (one in which at least 90% of the light is within a 50 nanometer range) across a first code displayed on a screen of a device, causing the device to change the display to a second code. One then reads the second code based on a reflection of the laser or the LED light and disengages the shining of the laser or LED light on the screen of the device. The first code and the second code can be barcodes.

Described another way, a barcode can be displayed by exhibiting a visual representation of a first code on a screen of a device. Once determined that the barcode has been read, then a second bar code is displayed. Once it is then determined that the second barcode has been read, the display reverts back to displaying the first barcode.

The determinations that the barcodes have been read can be made in a variety of ways including detecting a laser beam hitting the device, such as by use of a camera on a same side of the device as the screen. Another way of making the determination is time-based. After a particular period of time, it can be determined that the second bar code has been "read" and the display reverts back to displaying the first barcode, such as after one second or half a second or even a tenth of a second, depending on the embodiment. Audible sound of a specific frequency emitted by a barcode reader can also be used as the determining factor. For example, the barcode reader may "beep" upon reading the barcode. Lack of receiving a laser beam (which, for purposes of this disclosure, unless stated otherwise, also includes any other type of barcode reader such as an LED light) can be used to determine that the second barcode is no longer being read. A change in frequency or intensity, or a different pulsation rate of the light emitting from the barcode reader can also be used to make such a determination.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

A code is displayed on a screen with a first set of indicia, the code designed to be read only by a computer system. A second code is displayed only when it is determined that the first code is being read. This determination is made by an optical sensor, such as a camera, detecting a particular wavelength of light above a threshold, the wavelength associated with an expected reader device. While the particular wavelength is detected the second code is displayed. Once the light is no longer detected, the display reverts back to the first code. In this manner, the second code, such as a barcode to be read, is only displayed while the barcode is actually being read, but is otherwise hidden from view. The entire process can take place in under a second or in a fraction of a second, such as 1/10th of a second or less.

Embodiments of the disclosed technology are described below, with reference to the figures provided.

Figure 1:
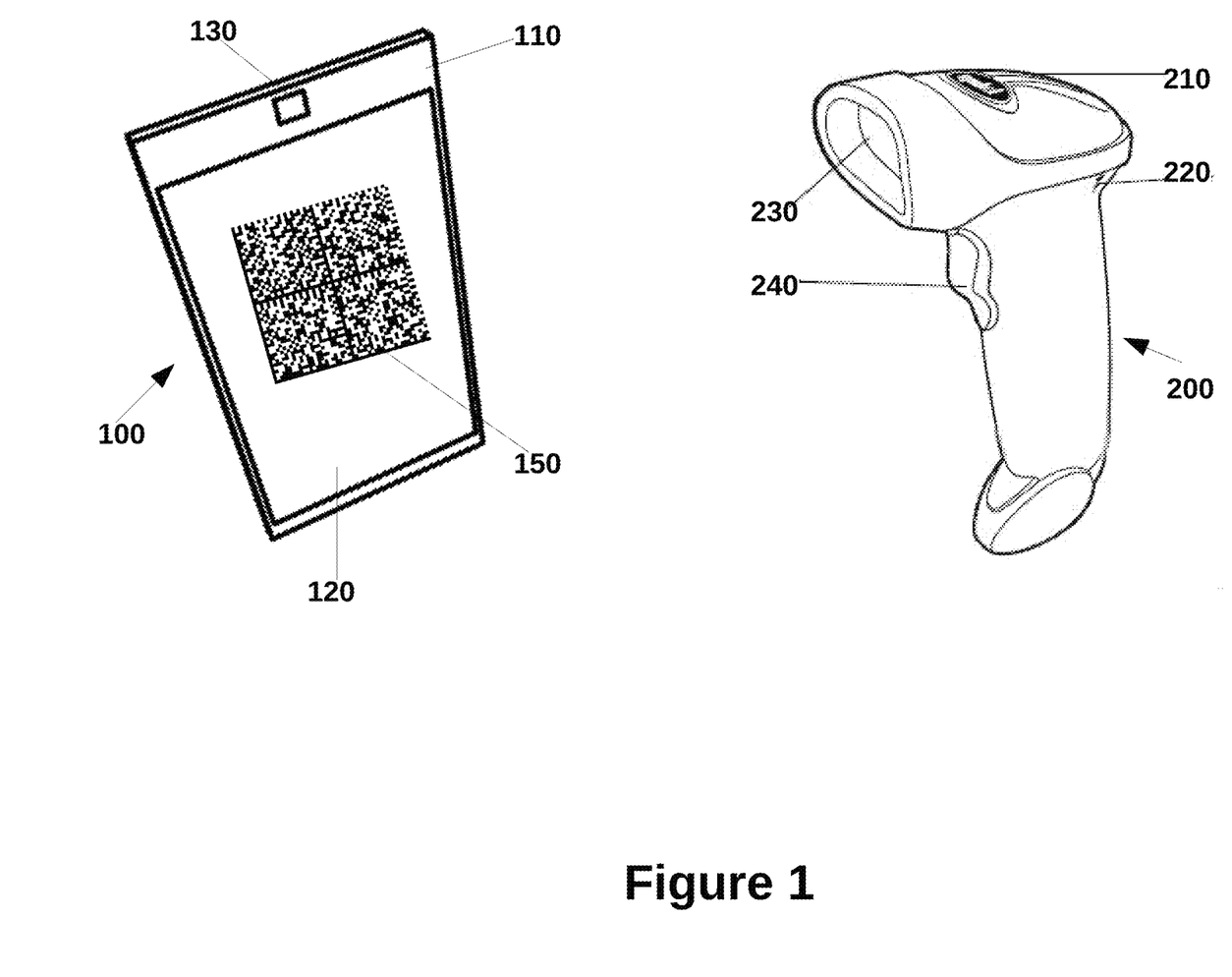
FIG. 1 shows a code displayed on a screen and a code reading device used in embodiments of the disclosed technology.

FIG. 1 shows a code displayed on a screen and a code reading device used in embodiments of the disclosed technology. A display device 100 is shown next to a code or barcode reader 200. The display device 100 has a front side 110 with a camera or optical sensor 130 and a display or screen 120. On the display or screen 120 is a barcode or other code 150. This is encoded data designed to be read by a computer system (for purposes of this disclosure, a computer system is a non-human and non-life form having a processor which carries out coded instructions). The display can be an LED (light emitting diode) display or any other display capable of changing in real-time ("real-time" defined as under 50 ms). The displayed code 150 is changed to another code after the optical sensor or camera 150 detects that the code is being read. This will be explained in more detail with reference to FIG. 2.

Still referring to FIG. 1, the barcode or code reader 200 has an optical sensor 230 which also comprises a transmitter in some embodiments, such as a laser light or LED transmitter. In this manner, light is transmitted to the front surface 110 of the display device 100 which is exhibiting a first code 150. Upon detection of this light, the code 150 changes to a second such code and this second code is read by the code reader by way of an input, such as the optical sensor 230. The code reader 200 further can have a switch 240 to activate transmission of the light source and read the code. A status display or light 210 can be used, as well as an input/output 220. The input/output 220 can include an audible sound or "beep" (noise at a specific frequency for less than one second) which can be detected by a sensor on the display device 110, as an indication that the second code has been read, such that the display device 110 reverts back to showing the first code, or, at least another code. The input/output 220 can also be a wireless transmitter or receive said communications wirelessly with the display device 110 to confirm the code 150 has been read.

Figure 2:
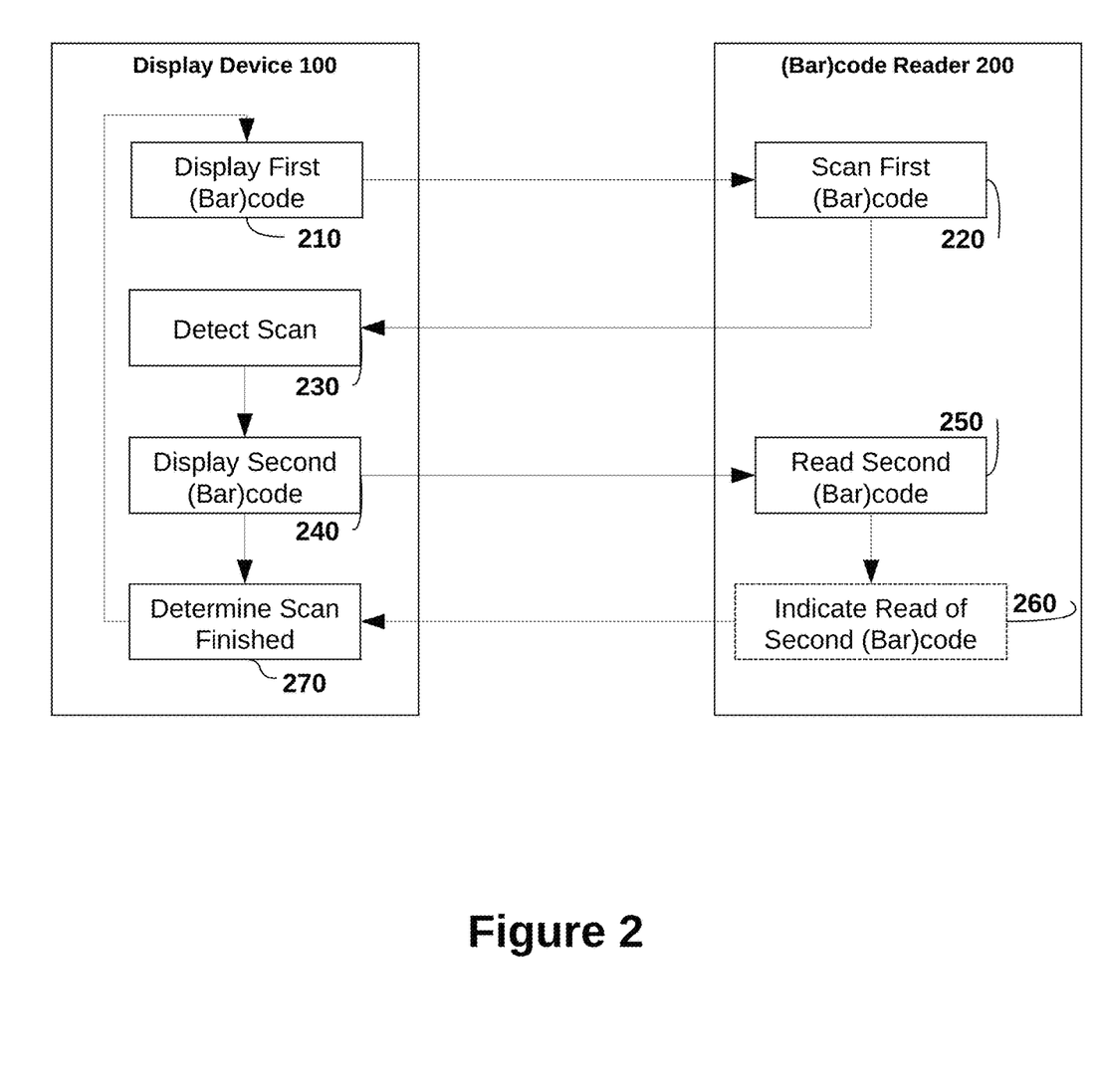
FIG. 2 shows the steps carried out to display and read codes of embodiments of the disclosed technology.

FIG. 2 shows steps carried out to display and read codes of embodiments of the disclosed technology. Steps generally carried out by the display device 110 are in the left column, while steps generally carried out by the barcode reader or scanner 200 are in the right column. In step 210, a first barcode (or other code or indicia) is displayed on the display of the display device 100. This is scanned by the barcode reader in step 220. Within the display device 100, a sensor, such as an optical sensor or camera receives data indicating that the scan is occurring in step 230. A processor or the like determines that a scan is happening based on receipt of a light pulse, for example, from the reader 200. The light, in embodiments of the disclosed technology, is at a discrete frequency within a 50 nm or 10 nm band. Within the band of light (visible, infrared, or ultraviolet) the magnitude of the light is at least twice the intensity (lux) of all other such light frequencies received. It can also be 5, 10, or 20 times the ambient light or light received at other frequencies which indicates that the code is being read. In response, the first barcode or other indicia displayed is removed from the display and a second barcode is displayed in step 240. In embodiments of the disclosed technology, this change in barcode is unknown and undetected by the barcode reader 200 and any processor or the like contained within a housing of the barcode reader. The change from the first code displayed in 210 through the second code being displayed in step 240 can take place in a matter of tenths of a second, such as less than 1/10th of a second, less than ½ of a second, or less than one second. The second barcode is then read by the barcode reader in step 250. Thus, from the perspective of the barcode reader, in embodiments of the disclosed technology, the reader simple scans and reads a single code without sensing that the displayed code has changed after emitting light on the display device and before actually reading the code.

In some embodiments, the display device changes back to the first bar code (carrying out step 210 again) after determining that the scan (reading) of the second barcode is finished. In one embodiment, this determination is made based on no longer receiving the laser or LED light emitting from the barcode reader 200 on the camera or optical sensor 130 of the display device 100. This may not indicate that the barcode was read, but at least, that it's no longer trying to be read. As such, in this embodiment, the second barcode or code in step 240 is displayed only when there is light of a discrete wavelength shining on the display, which makes it more difficult to take a picture of or see the second barcode. The second barcode is only displayed, in this embodiment, with the specific wavelength of light above a threshold shining thereupon.

In another embodiment, the scan is determined as finished based on an indication that the barcode has been read in step 260, which is transmitted from the barcode reader 200 to the display device 100. One example of how this transmission takes place is with an audible "beep" or sound which takes place after the barcode reader 200 successfully reads the barcode in step 250. The "beep" upon reading the barcode is well known to those who, for example, shop at supermarkets and hear the familiar beep after each item is scanned. Once this beep is detected by the display device 100, even if the laser/light from the barcode reader 200 is still shining thereupon, the display can revert from the second barcode (step 240) to the first barcode (steps 270 and 210).

The step 260 of indicating that the second barcode has been read is only carried out in some embodiments of the disclosed technology. However, when it is carried out, other ways include with wireless transmission/communication with the display device 110 such as via radio frequency or a packet-switched network. The barcode reader 200 might send, via a data network, what it has read from the first or second barcode, or some form or hash value thereof, to the display device which then displays the second barcode. The second barcode, or part thereof, can also be sent back from the reader to the display device in some embodiments as a form of verification before the second barcode is no longer displayed on the display device 100.

Further, the method shown in FIG. 2 can be carried out in its entirety in less than 1 second or ½ a second in embodiments. Still further, it can be carried out repeatedly, back to back. After the scan is finished in step 270, then when step 210 is repeated, it can be done for a different first and/or second barcode. That is, once the second barcode is scanned, the next is ready for scan. One can keep scanning barcodes, one right after the next. As soon as one scan of a second barcode in step 240 is completed, the next cycle begins with every changing barcode. The barcodes can be coupons, so for example, where someone has 10 coupons, they can be scanned in quick succession (less than 1 second per cycle from steps 210 through 270), one after the other.

Figure 3:
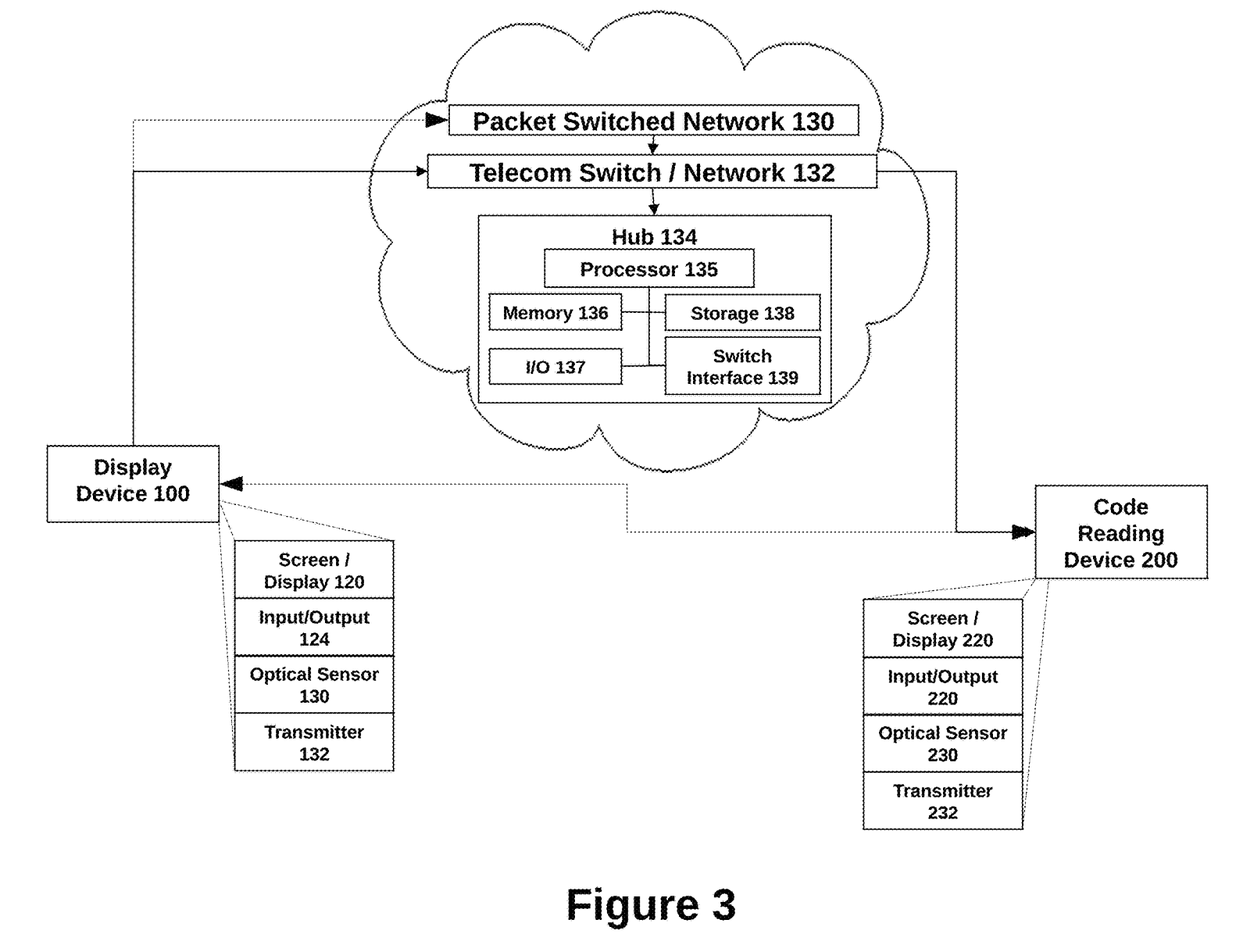
FIG. 3 is a high-level device diagram of devices used in embodiments of disclosed technology.

FIG. 3 is a high-level device diagram of devices used when embodiments of disclosed technology are carried out. The display device 100 is a device with at least one side having both a screen or display 120 and optical sensor 130. It further can have a plurality of input/outputs 124, such as wireless network (802.11 "wi-fi"/cellular) transceiver, touch screen, and microphone or speaker. The optical sensor 130 can be a camera receiving still pictures of video which are interpreted. A processor can determine the wavelength/frequency of received light and when this received light is above a threshold at a particular frequency or frequency range. In this manner, the device determines when the screen/display 120 is being read by another device and can transmit this data through a transmitter 132.

Likewise, the code reading device 200 can have a screen/display 220, an input/output 220, an optical sensor 230 and a transmitter 232. Elements of the display device have been incremented by 100 when shown with reference to the code reading device 200. The transmitters enable wireless transmission and receipt of data via a packet-switched network, such as packet-switched network 130. This network, in embodiments, interfaces with a telecommunications switch 132 which routes phone calls and data between two of the bi-directional transceivers 110 and 120. Versions of these data, which include portions thereof, can be transmitted between the devices. A "version" of data is that which has some of the identifying or salient information as understood by a device receiving the information. For example, a transmitter may transmit data stored in the barcode as a series of alphanumeric characters, but the data is stored in an image, as the barcode, when displayed.

Referring again to the telecom switch 132, a device and node where data are received and transmitted to another device via electronic or wireless transmission, it is connected to a hub 134, such as operated by an entity controlling the methods of use of the technology disclosed herein. This hub has a processor 135 deciding how the bi-directional transceivers 110 and 120 are matched to each other, and which bi-directional transceiver 120 receives instructions to travel to a location and perform a service/job. This hub 134 further has memory 136 (volatile or non-volatile) for temporary storage of data, storage 138 for permanent storage of data, and input/output 137 (like the input/output 124), and an interface 139 for connecting via electrical connection to other devices.

Figure 4:
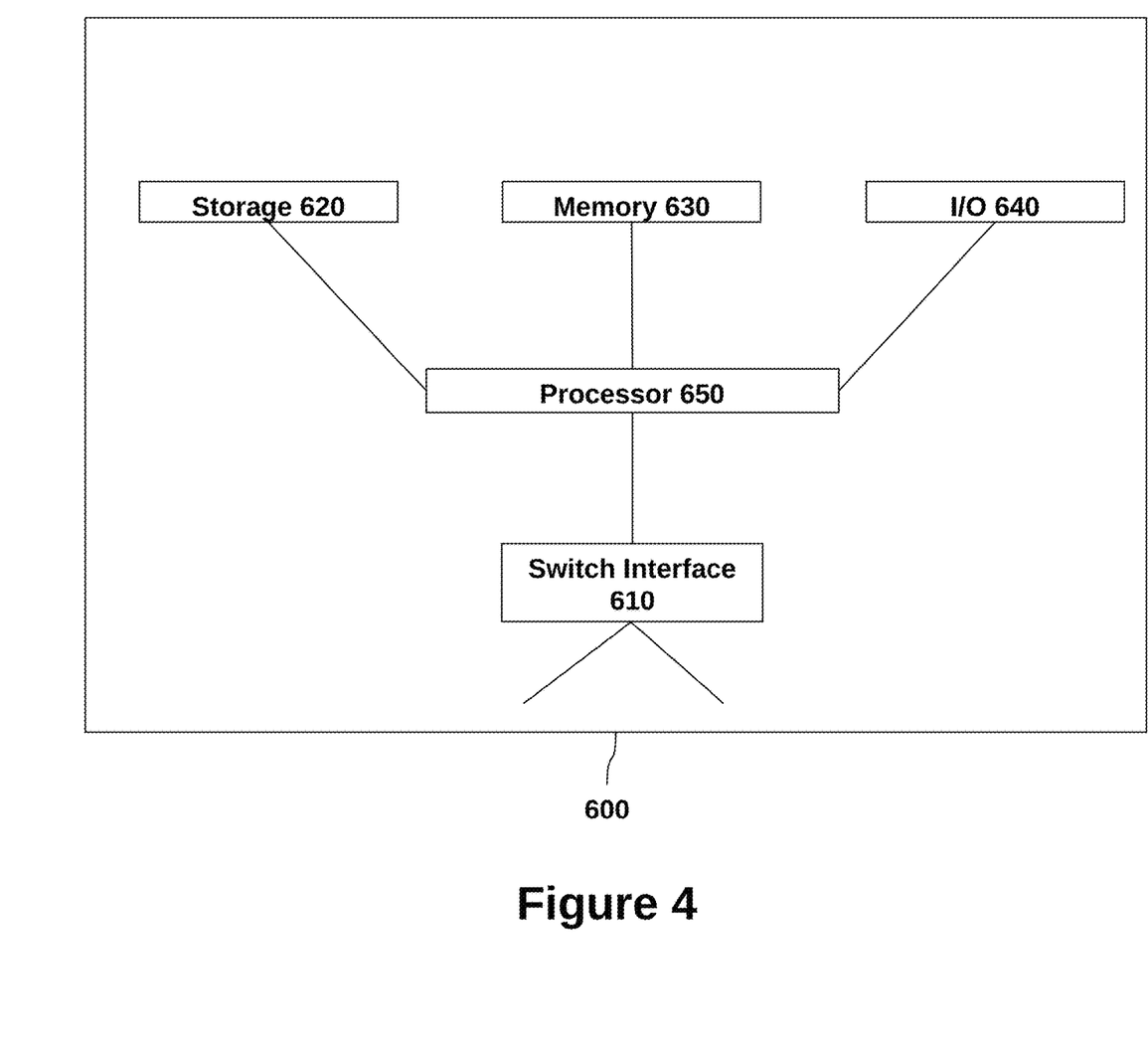
FIG. 4 shows a high-level block diagram of a device that may be used to carry out the disclosed technology.

FIG. 4 shows a high-level block diagram of a device that may be used to carry out the disclosed technology. Device 600 comprises of a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices, which allow for user interaction with a computer (e.g., display, keyboard, mouse, speakers, buttons, etc.). One skilled in the art will recognize that an implementation of an actual device will contain other components as well, and that FIG. 4 is a high-level representation of some of the components of such a device, for illustrative purposes. It should also be understood by one skilled in the art that the method and devices depicted in FIGS. 1 through 3 and 5 through 6 may be implemented on a device such as is shown in FIG. 4.

Figure 5A:
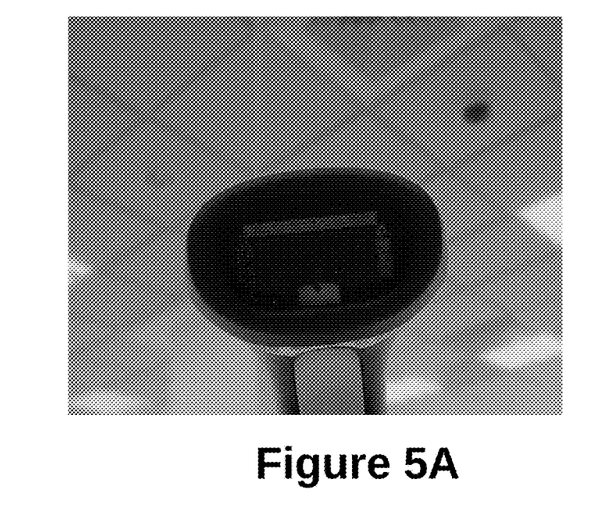
FIG. 5A is a photograph of a code reading device, as seen by a camera of a display device.
Figure 5B:
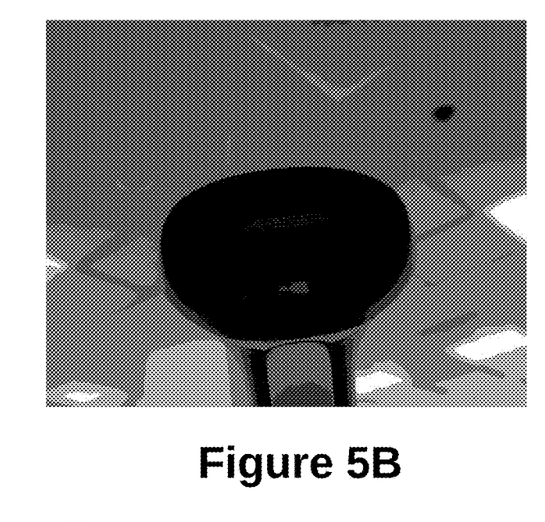
FIG. 5B is a grey-scale image of the photograph of FIG. 5A with each color representative of a range of brightness.
Figure 5C:
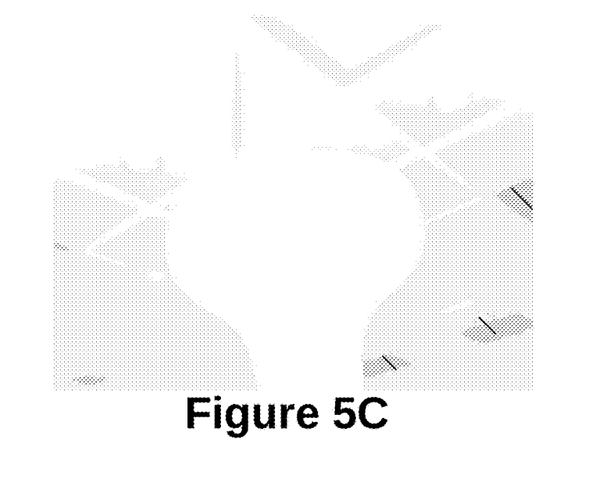
FIG. 5C shows lines drawn over the greatest differences in brightness over smallest portion of the image of FIG. 5B.

FIG. 5A is a photograph of a code reading device, as seen by a camera of a display device. FIG. 5B is a grey-scale image of the photograph of FIG. 5A with each color representative of a range of brightness. FIG. 5C shows lines drawn over the greatest differences in brightness over smallest portion of the image of FIG. 5B. The code reading device is an example of a device 200 described with reference to FIG. 1. Here, the photograph in FIG. 5A shows the device inactive. The greatest areas of change in light intensity (brightness) are actually from background lighting. Diagonal lines in FIG. 5C are marked based on such greatest changes in intensity. As these changes are multiple and lack enough intensity of change over distance, no determination that the device is being scanned with a code reader that functions by way of light (e.g. laser) is being made at the time shown in FIGS. 5A, 5B, and 5C.

Figures 6A, 6B, 6C:
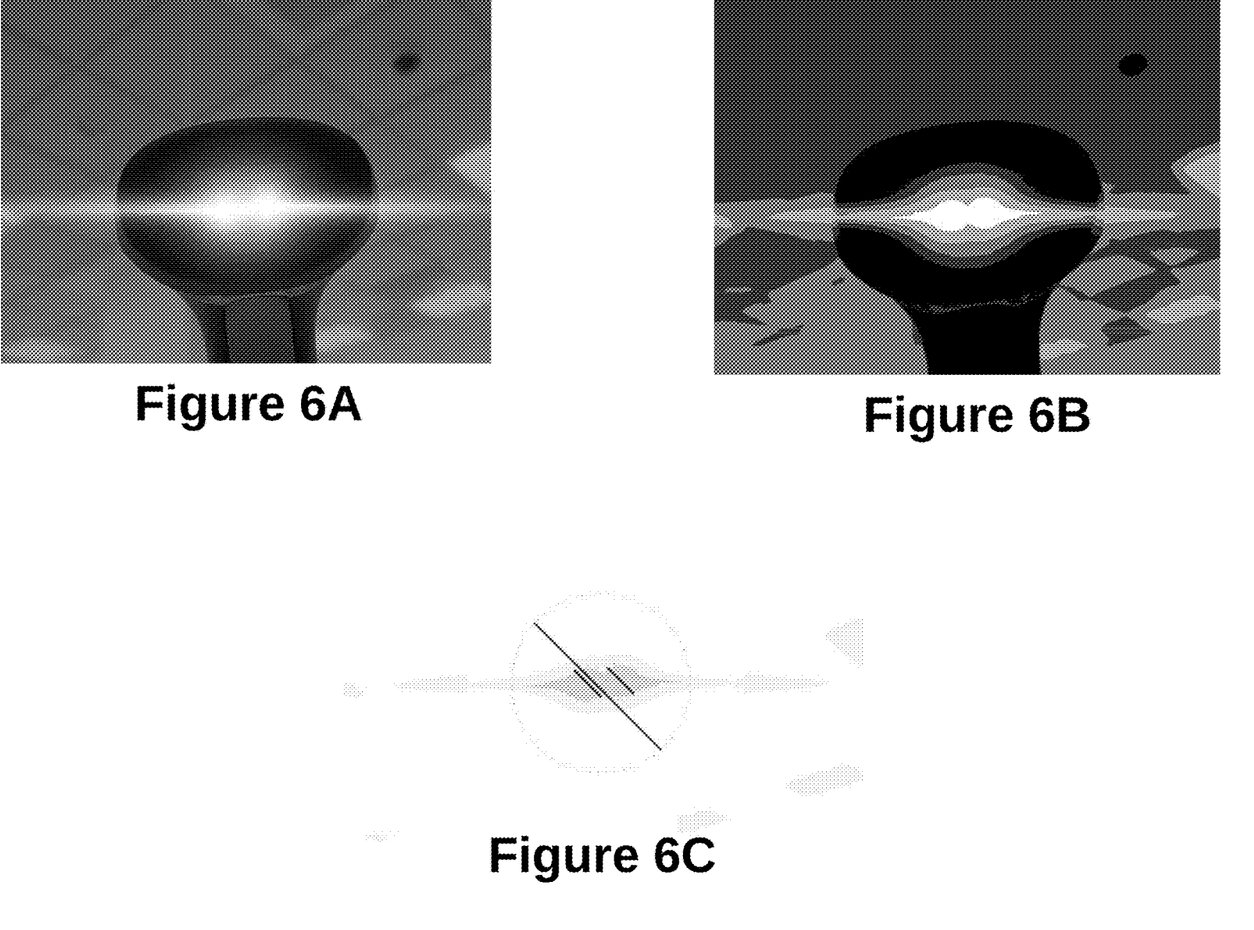
FIG. 6A is a photograph of the code reading device of FIG. 5A, while the code reading device is actively scanning for a code.
FIG. 6B is a grey-scale image of the photograph of FIG. 6A with each color representative of a range of brightness.
FIG. 6C shows lines drawn over the greatest differences in brightness over smallest portion of the image of FIG. 6B.

FIG. 6A is a photograph of the code reading device of FIG. 5A, while the code reading device is actively scanning for a code. FIG. 6B is a grey-scale image of the photograph of FIG. 6A with each color representative of a range of brightness. FIG. 6C shows lines drawn over the greatest differences in brightness over smallest portion of the image of FIG. 6B. Here, with the code reader 200 actively scanning, a gradient of difference in light over a shorter distance is detected based on what's shown in FIG. 6B. The diagonal line is again drawn over the places of greatest difference in light intensity over distance and the length and closeness of the diagonal lines is used to determine that a scan is being made.

Described another way, based on brightness of different parts of the image it is approximated to three levels of brightness: "dark", "light" and "medium" based on the ⅓ greatest changes in light, ⅓ least change in light, and ⅓ between the other two categorizations. Positions of the light and medium sports are determined across the images by scanning on X and Y axis, and finding the edges, i.e. transition from dark to medium, medium to light and vice versa. Once the edges are determined, the dark part is disregarded for purposes of finding a scanning light. Relative proportions on an imaginary line drawn at 45 degrees to X axis (as well as Y axis due to the sum of angles being 180 degrees) and compared to certain predefined parameters in terms of size and relative position, and a decision is made whether this is a picture of a code reader actively reading the screen of the device or not. Based on user input of when a code reader is scanning the device displaying the coupon, the intensity can be calibrated manually to determine same. Further, the more such code readers used across all devices displaying coupons, the more data points can be used to calibrate each one. This method is efficient and requires a comparatively low amount of processing power than making individual determinations of full color images because one need only compare brightness intensity and length of a diagonal line across the greatest areas of change. Hough transforms, known in the art, can also be used to determine that a code reader which uses light is being aimed at the device displaying the coupon.

Further, it should be understood that all subject matter disclosed herein is directed at, and should be read only on, statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A method of authentication of a code comprising:
   exhibiting a first code on a screen visible to a user;
   detecting a light above a threshold of intensity and/or a light above a threshold change in intensity over a specific distance at a camera facing in a same direction as said screen;
   in response to said detecting, changing said first code on said screen to a second code;
   in response to ending of said detecting, removing exhibition of said second code and exhibiting said first code.

2. The method of claim 1, wherein said light passes across at least a part of said first code and said second code.

3. The method of claim 2, wherein a confirmation is received indicating that said second code has been read using said light.

4. The method of claim 3, wherein said light is a laser beam at a specific wavelength of light, said laser beam being detected by said camera based on said specific wavelength and said threshold change in intensity over said specific distance.

5. The method of claim 1, wherein said second code is displayed on said screen only while said light is above a threshold of intensity is detected by said camera, wherein said light is used to read contents of said second code.

6. The method of claim 5, wherein said first code and said second code are intended to be read only by a computer system.

7. The method of claim 6, wherein said second code is a coupon.

8. The method of claim 1, wherein each step of said method is carried out in under one second.

9. A method of displaying a barcode comprising the step of:
   exhibiting a visual representation of a first code on a screen of a device;

determining that said first code is being read;

changing said first code to a second code, said second code being a barcode;

determining that said second code has been read;

removing said second code from said screen;

exhibiting said first code in place of said second code;

wherein detection of said laser or LED light beam is made by a camera on a same side of said device as said screen.

10. The method of claim 9, wherein said determining that said first code is being read is determined by way of detecting a laser or LED light beam hitting said device.

11. The method of claim 9, wherein said determining that said second code has been read is determined by way of determining that said laser or LED light beam is no longer hitting said device.

12. A method of displaying a barcode comprising the step of:

exhibiting a visual representation of a first code on a screen of a device;

determining that said first code is being read;

changing said first code to a second code, said second code being a barcode;

determining that said second code has been read;

removing said second code from said screen and re-displaying said first code on said screen;

wherein said determining that said second code has been read is determined by way of detecting a change in at least one of frequency, pulsation rate, or intensity of a laser or LED light beam.

13. The method of claim 12, further comprising repeating each step of claim 12 with another first bar code and another second bar code; wherein said method of claim 12 and said repeat of each step of claim 12 in total takes less than one second.

14. The method of claim 12 wherein said detecting said change includes said detecting a change in said intensity.

* * * * *